(12) United States Patent
Plett et al.

(10) Patent No.: US 7,637,563 B2
(45) Date of Patent: Dec. 29, 2009

(54) SELECTIVELY REMOVABLE SIDE FAIRING FOR A VEHICLE

(75) Inventors: Matthew M. Plett, Portland, OR (US); Peter G. Vanoni, Portland, OR (US); Charles P. Suriano, West Linn, OR (US); Melissa Hosaka, Portland, OR (US); Boguslaw R. Gadowski, Tigard, OR (US); Timothy J O'Neal, LaCenter, WA (US)

(73) Assignee: Daimler Trucks North America LLC, Portland, OR (US)

( * ) Notice: Subject to any disclaimer, the term of this patent is extended or adjusted under 35 U.S.C. 154(b) by 0 days.

(21) Appl. No.: 11/985,849

(22) Filed: Nov. 16, 2007

(65) Prior Publication Data

US 2008/0129079 A1 Jun. 5, 2008

Related U.S. Application Data

(60) Provisional application No. 60/859,734, filed on Nov. 17, 2006.

(51) Int. Cl.
*B60J 7/00* (2006.01)
(52) U.S. Cl. .................................. 296/198; 280/166
(58) Field of Classification Search .............. 296/180.2, 296/190.01, 198; 180/200; 280/163, 166
See application file for complete search history.

(56) References Cited

U.S. PATENT DOCUMENTS

| | | | |
|---|---|---|---|
| 4,836,568 A | 6/1989 | Preslik et al. | |
| 4,925,235 A | 5/1990 | Fingerle | |
| D313,954 S | 1/1991 | Fingerle | |
| 4,991,906 A | 2/1991 | Fingerle | |
| 5,228,707 A * | 7/1993 | Yoder | 280/166 |
| 5,536,062 A | 7/1996 | Spears | |
| 5,595,419 A | 1/1997 | Spears | |
| 5,788,321 A | 8/1998 | McHorse et al. | |
| 5,947,520 A * | 9/1999 | McHorse | 296/198 |
| D420,622 S | 2/2000 | Hellhake et al. | |
| D425,826 S | 5/2000 | Hellhake et al. | |
| 6,076,844 A * | 6/2000 | Stuart et al. | 280/163 |
| D434,348 S | 11/2000 | Delashaw et al. | |
| 6,179,312 B1 * | 1/2001 | Paschke et al. | 280/166 |
| 6,264,222 B1 * | 7/2001 | Johnston et al. | 280/166 |
| 6,340,191 B1 | 1/2002 | Brady | |
| D465,749 S | 11/2002 | Beigel | |

(Continued)

OTHER PUBLICATIONS

Three photographs of prior art side fairing with latch.

*Primary Examiner*—Kiran B. Patel
(74) *Attorney, Agent, or Firm*—Klarquist Sparkman, LLP

(57) ABSTRACT

A detachable side fairing for a vehicle in one form comprises a panel body that can include steps. An access opening is defined by the panel body and is opened and closed by a door, such as the riser of a step, to allow access to the rear of the panel. A latch actuator can be accessed through the access opening for use in operating a latch to allow movement of the panel body away from the vehicle. The latch actuator can comprise first and second actuators comprising respective first and second elongated handles that each actuates an associated latch to release the panel body. The handles can be configured to prevent closing of the door when the actuators have not been moved to a position that completes the latching of the panel body to the vehicle.

15 Claims, 11 Drawing Sheets

U.S. PATENT DOCUMENTS

| | | |
|---|---|---|
| 6,767,023 B1 * | 7/2004 | Nicholson .................. 280/165 |
| 6,883,860 B1 | 4/2005 | Budge |
| D532,731 S | 11/2006 | Angelo et al. |
| 7,131,655 B2 * | 11/2006 | Schumacher ................ 280/163 |
| 7,163,258 B2 | 1/2007 | Dyer et al. |
| D539,704 S | 4/2007 | Angelo et al. |
| 7,334,807 B2 * | 2/2008 | Mulder et al. ............... 280/163 |
| D566,009 S | 4/2008 | Beigel et al. |
| 2005/0012344 A1 | 1/2005 | Sorrells et al. |
| 2006/0255558 A1 * | 11/2006 | Okuyama ................... 280/166 |
| 2008/0100022 A1 * | 5/2008 | VanBelle et al. ............ 280/163 |
| 2008/0129079 A1 * | 6/2008 | Plett et al. ................ 296/146.5 |
| 2008/0231079 A1 | 9/2008 | Grady et al. |
| 2009/0078827 A1 * | 3/2009 | Martin .................. 296/193.01 |

* cited by examiner

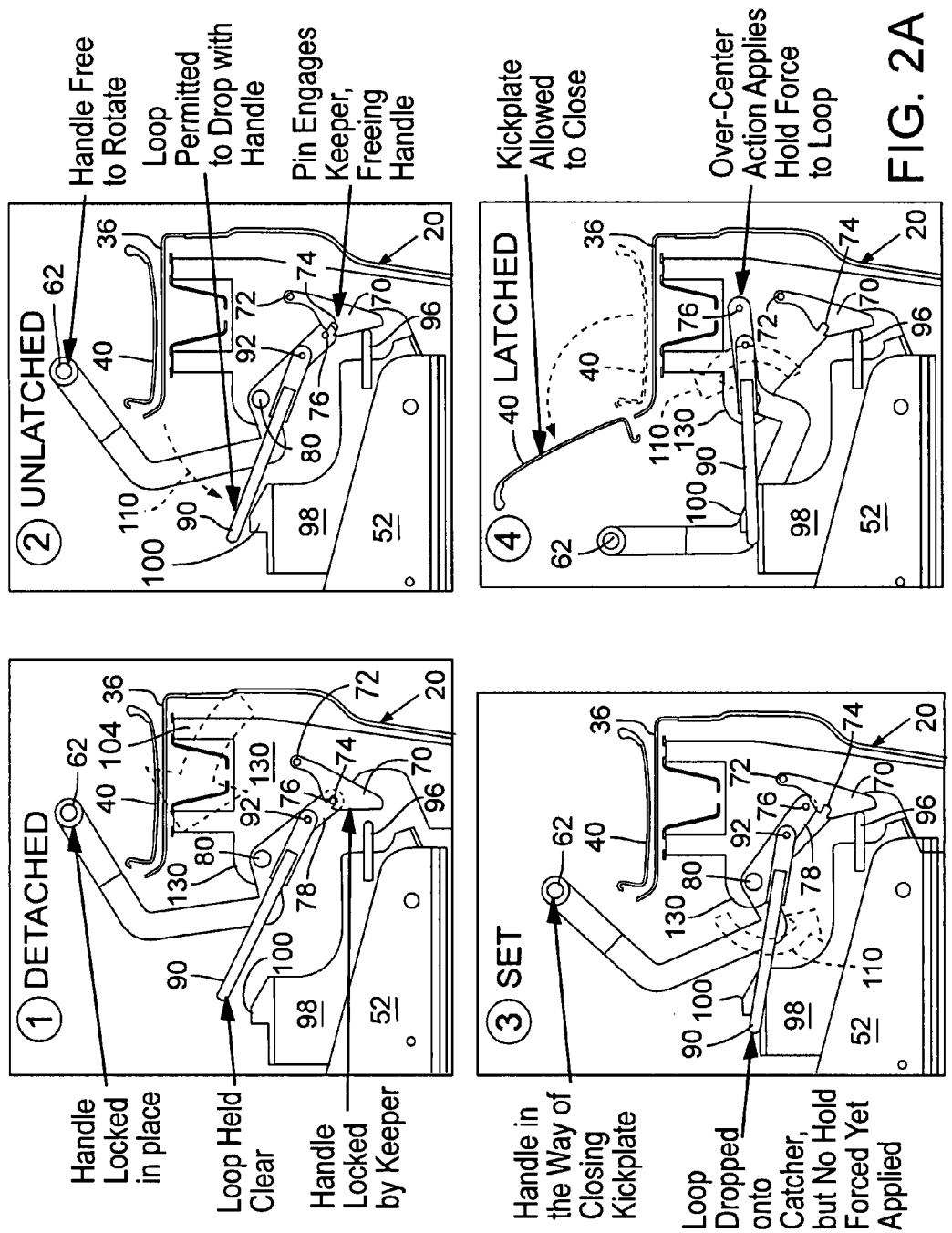

SELECTIVELY REMOVABLE SIDE FAIRING FOR A VEHICLE

RELATED APPLICATION DATA

This application claims the benefit of U.S. provisional patent application No. 60/859,734, filed Nov. 17, 2006, entitled, "Selectively Removable Side Faring For A Vehicle", which is hereby incorporated by reference.

TECHNICAL FIELD

The disclosure relates to side panels or fairings for vehicles and in particular toward selectively removable or detachable side fairings.

OVERVIEW OF AN ILLUSTRATED EMBODIMENT

Detachable side fairings are desirable so as to permit selective access to areas behind the panel or fairing. For example, in large vehicles such as semi-trucks, the batteries of the vehicle may be positioned forwardly, such as near the driver's side of the vehicle outside of vehicle frame rails and directly underneath the driver's door. By positioning the batteries at such a location, the batteries are closer in proximity to the starter and engine of the vehicle, thereby providing a cost savings for the vehicle electrical system.

Because batteries require frequent inspection and occasional maintenance and replacement, trucks and other vehicles with side fairings or panels would benefit from the removable side fairing panel that allows quick and easy access to the battery compartment. Alternatively, such removable side panels can provide quick and easy access to a toolbox, or other type of compartment or accessory, regardless of whether batteries are present near the removable panel.

In accordance with one aspect of an embodiment, plural latches, such as two latches, secure the panel and are operated by respective handles that can be accessed through a door located, for example, near the top of the removable panel. The door may comprise a kick plate or riser portion of a step of a plural step panel. The kick plate may be pivotally mounted to the panel so that it can be folded to an open position, for example downwardly, to provide access to the latch actuating handles. In addition, in constructions where batteries are located behind the removable panel, pivoting of the kick plate to an open position can provide access to the batteries for inspection without requiring the removal of the panel to provide more complete access.

As another aspect of the embodiment, to remove the panel, the operator opens the access door and then grips the latch actuating handles. The handles can then be moved, such as pulled toward the operator, to unlatch the latches. Once unlatched, the panel for example, can be pivoted, such as toward the operator. The panel can be rotated to a position which allows the panel to be removed from panel supports. The handles used to unlatch the panel can be provided with a locking mechanism that secures the handles in place so that the handles can also be located for use to carry the panel following its removal. In contrast, to reinstall or reattach the removable side fairing to the vehicle, an operator can carry the panel by the handles and align panel pivot mechanisms, such as lower bushings with respective vehicle mounted holders or panel supports. The bushings can be inserted into the holders and the panel can be pivoted toward a closed position.

In one specific approach, the handles latch the latches by movement of the handles in the inboard direction after the panel has been shifted to a closed position. Thereafter, the operator can again close the access door or kick plate. To provide a warning to the operator, the handles can be configured to interfere with closing the access door or kick plate in the event the handles are not returned to the fully latched position. Also, if the access door is open, the operator does not have easy access to a step or a tread plate thereon, thereby warning the operator by hindering ingress into the cab.

In desirable embodiments, the latches can operate as over-center latches. In one specific embodiment, the handles are coupled to a loop that, when latched, connects to a loop catcher that is attached to a chassis mounting bracket. In this embodiment, the handle and loop pivot in such a way as to increase the latching force on the loop catcher until the handle reaches a certain point. Further rotation of the handle causes the force to reduce on the loop catcher. The handles and loops are prevented from turning too far, such as by stops, so that latching is maintained. The loop or loop support can be biased so it is forced or urged toward the latched position. Again, desirably two such handles are provided.

In a more specific exemplary approach for locking handles in a locked position for use in carrying a panel that has been detached from the chassis, a respective keeper mechanism for each handle activated latching mechanism can be utilized. The keeper mechanism can be spring biased and designed to interlock with the handle when the handle is in the unlatched position and the panel is in the open position. When the panel is closed, a mechanism, such as a pin or tab, on a chassis mounting bracket, urges the keeper away from the handle, such as rotating the keeper away from the handle, allowing the handle to pivot freely under such conditions. Again, desirably two such handles and keeper mechanisms are provided.

Lower bushings on the panel desirably fit snugly into corresponding receptacles on mounting brackets. These mounting brackets can include openings shaped to guide the respective bushings into their final positions. In one specific embodiment, an elastomeric bumper, such as a rubber bumper, is used to apply a force between each mounting bracket and a corresponding respective support bracket on the removable side fairing. This force assists in the operation of an over-center latch.

Although not essential, it is desirable to provide a removable side fairing that can be latched and unlatched without requiring the use of tools. In addition, for side fairings positioned beneath a driver's door, the side fairing can incorporate steps to facilitate access to the cab of the vehicle.

A mechanism, such as a detachable cable, can also be used to hold the fairing at a defined angle after unlatching the panel to permit a defined access for the panel while the panel is still attached to the vehicle. Such a mechanism would keep the panel from falling to an entirely open position when the handles are operated or, in the alternative, assist in securing the panel to the truck in the unlikely event the latches unlatch while the vehicle is traveling along the highway.

As another aspect of an embodiment, the detachable fairing or panel can accommodate a lock, such as a padlock, to prevent removal of the panel by unauthorized users.

The disclosure is not limited to the specific embodiments described herein. In addition, the disclosure is directed toward all novel and non-obvious elements and method acts described herein, both alone and in combinations and subcombinations with one another. There is no requirement that the disclosure satisfy all or specific problems of known designs nor that an embodiment address all of the advantages disclosed herein. It should also be noted that, in this description, the term "include" or "including" has the same broad meaning as "comprise" and "comprising", respectively. Also, the terms "a" and "an" encompasses singular as well as plural unless expressly excluded. Thus, the presence of plural elements or features means that there is a or one of such features also present.

BRIEF DESCRIPTION OF THE DRAWINGS

FIG. 2A is a schematic illustration of the operation of an embodiment of a latching mechanism.

DETAILED DESCRIPTION

Figure 1:
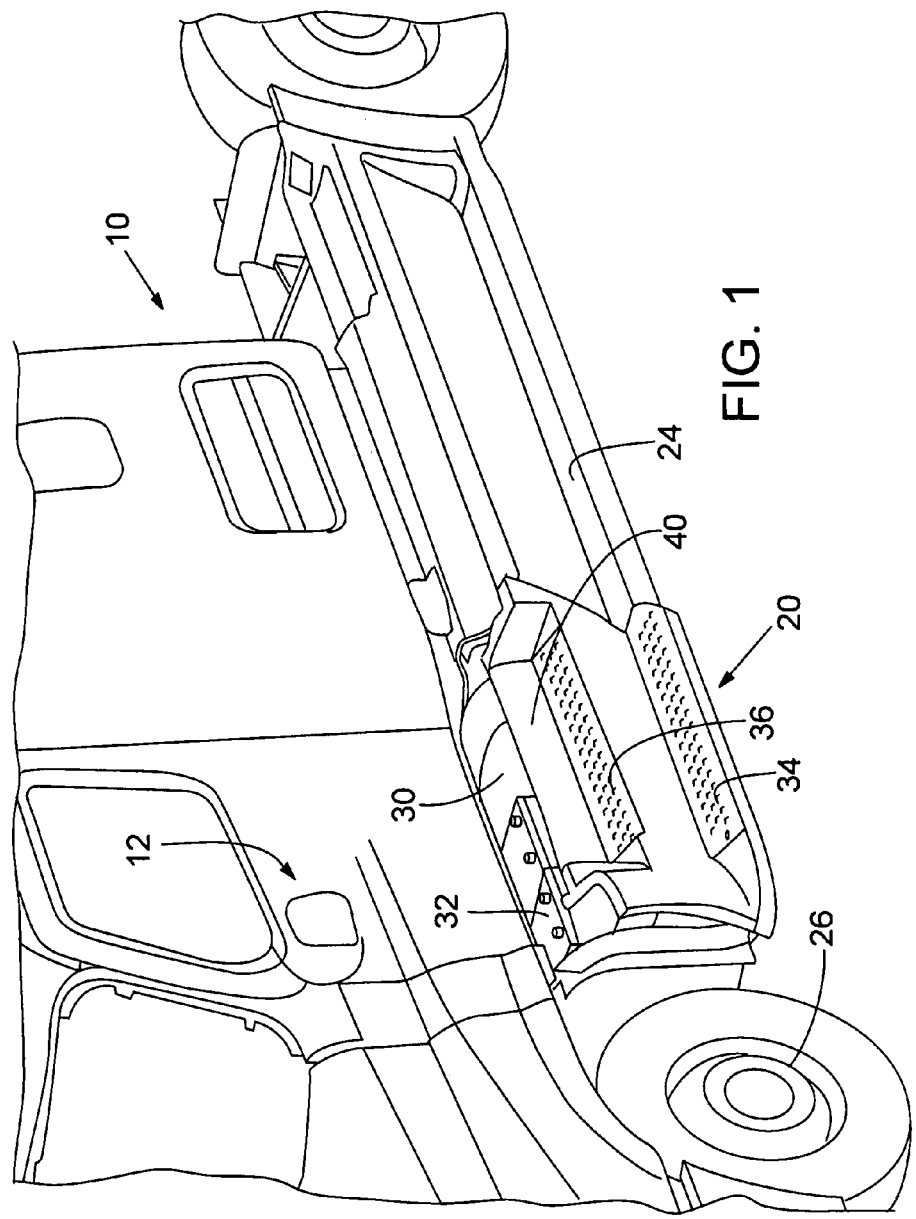
FIG. 1 is a perspective view of a portion of a semi-truck with an exemplary detachable side fairing shown in a partially open position.

Referring to FIG. 1, a truck 10 is illustrated with a driver's side door 12 (in American style vehicles). The illustrated truck comprises a detachable side fairing or panel 20 that is selectively detachable as explained below. The truck can also comprises a non-detachable fairing 24 rearwardly of the detachable fairing. In the FIG. 1 embodiment, the detachable fairing 20 is positioned beneath the driver's door 12 and rearwardly of the front vehicle wheel 26. A compartment 28 is provided behind the detachable fairing 20, as indicated by the number 30 in this example. Batteries 32 are shown in this particular compartment. Thus, access to the batteries is provided by selectively detaching the detachable panel 20. The illustrated panel 20 also comprises steps 34,36 to provide or facilitate ingress and egress into and out of the cab of the vehicle through the driver's door 12.

Figure 2:
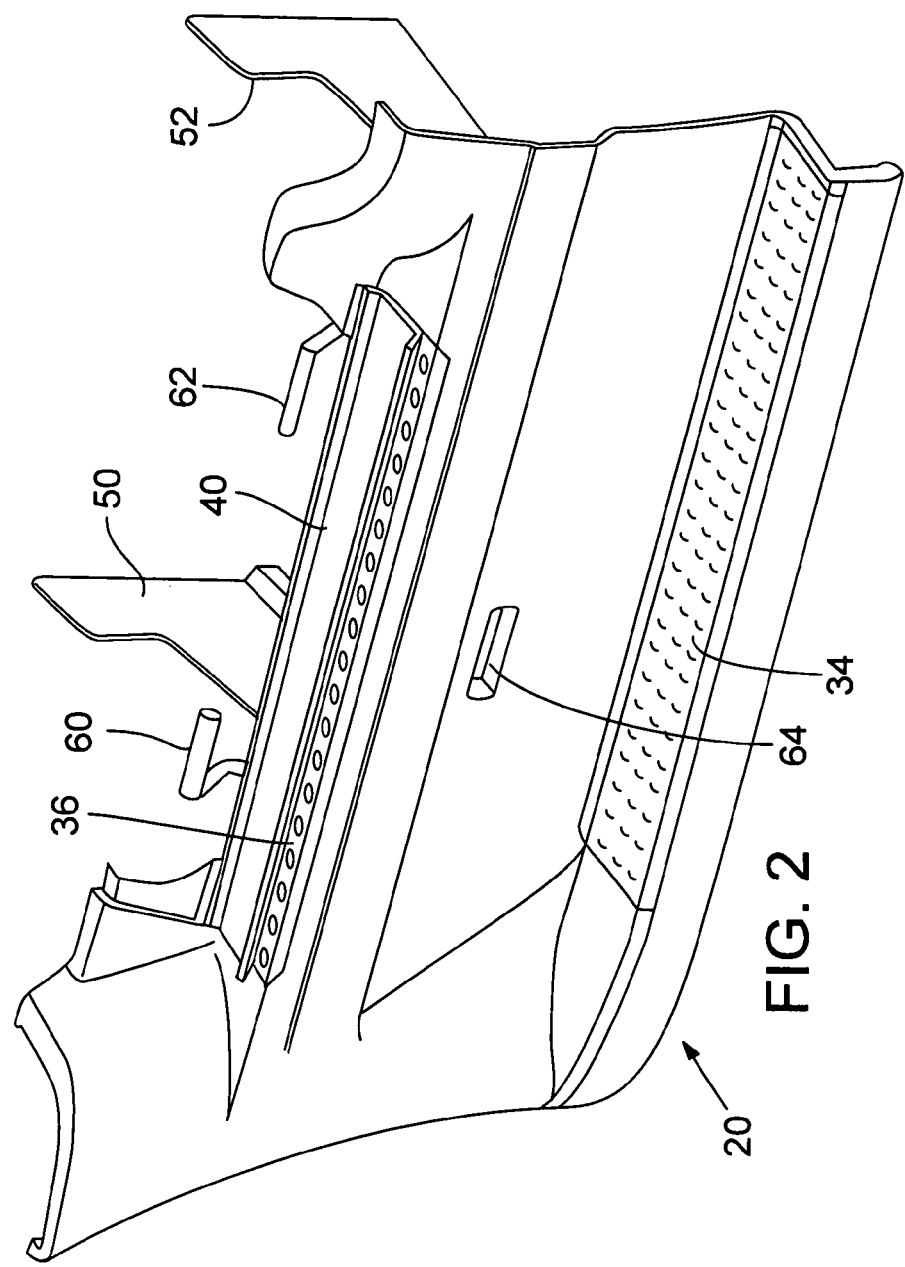
FIG. 2 is a perspective view of one embodiment of a side fairing having a kick plate pivoted to an open position to provide access to latch actuating handles provided behind the kick plate.

With reference to FIG. 2, the illustrated detachable panel 20 can have a kick plate 40 that comprises a riser extending upwardly from the step 36. Kick plate 40 is movable from a first closed position shown in FIG. 1 to a second open position shown in FIG. 2. In this example, kick plate 40 is pivotally coupled to the fairing 20 so that it can be pivoted from closed to open positions. First and second mounting brackets 50,52 are shown in FIG. 2. These mounting brackets are coupled to an associated frame rail of the vehicle along the driver's side of the vehicle in this example. The term "coupled" in this description includes both direct mounting and indirect mounting through one or more other components. Although not shown in FIG. 2, the supports 50,52 extend outwardly from the associated frame rail toward the detachable fairing or panel and have supports coupled thereto for carrying or supporting the panel when the panel is attached to the vehicle. Desirably, these supports allow the panel to be pivoted between closed (attached) and opened (for removal) positions. As can be seen in FIG. 2, when the kick plate 40 is in the open position, first and second latch actuating handles 60,62 (which can be of other shapes and configurations than those shown in FIG. 2), are readily accessible through the opening previously covered by the kick plate. Also, a handhold opening 64, or recess, can be provided in the face of the panel for grasping by an operator to assist in carrying or supporting the panel, for example, when it is installed.

A schematic illustration of an exemplary latching mechanism is shown in FIG. 2A. More specifically, in FIG. 2A-1, the panel 20 is shown in a detached position. When in this position, a keeper 70, pivoted by pivot 72 to the panel structure, has a keeper receiver, such as a slot 74, positioned to receive a handle locking mechanism, such as a pin 76, coupled to a lower end portion 78 of the handle 62. The handle is pivoted at 80 to the panel structure. When in this position, a latch mechanism, such as a loop 90, pivoted to the panel structure at 92 and more specifically to the handle, is held by the handle in the position shown. A keeper disengaging mechanism, such as a disengaging pin 96, is shown carried by a bracket 98 coupled to the frame mounting bracket 52. A latch receiving catch 100 is also coupled to the bracket 98. In FIG. 2A-1, the panel is shown being pivoted in the direction of an arrow 104 toward a closed position. When in this position, lower pivots on the panel, such as bushings, can be received in a pivot support included in bracket 98 or the frame bracket 52. With reference to FIGS. 2A-2, as the panel 20 is shifted toward a closed position, pin 96 engages the keeper 70 so as to pivot the keeper 70 and free the pin 76 from pin receiving slot 74 so that the handle is free to pivot or rotate. When the handle is rotated in the direction of arrow 110 (about pivot 80), the loop 90 is positioned above the loop catcher 100.

Figure 3:
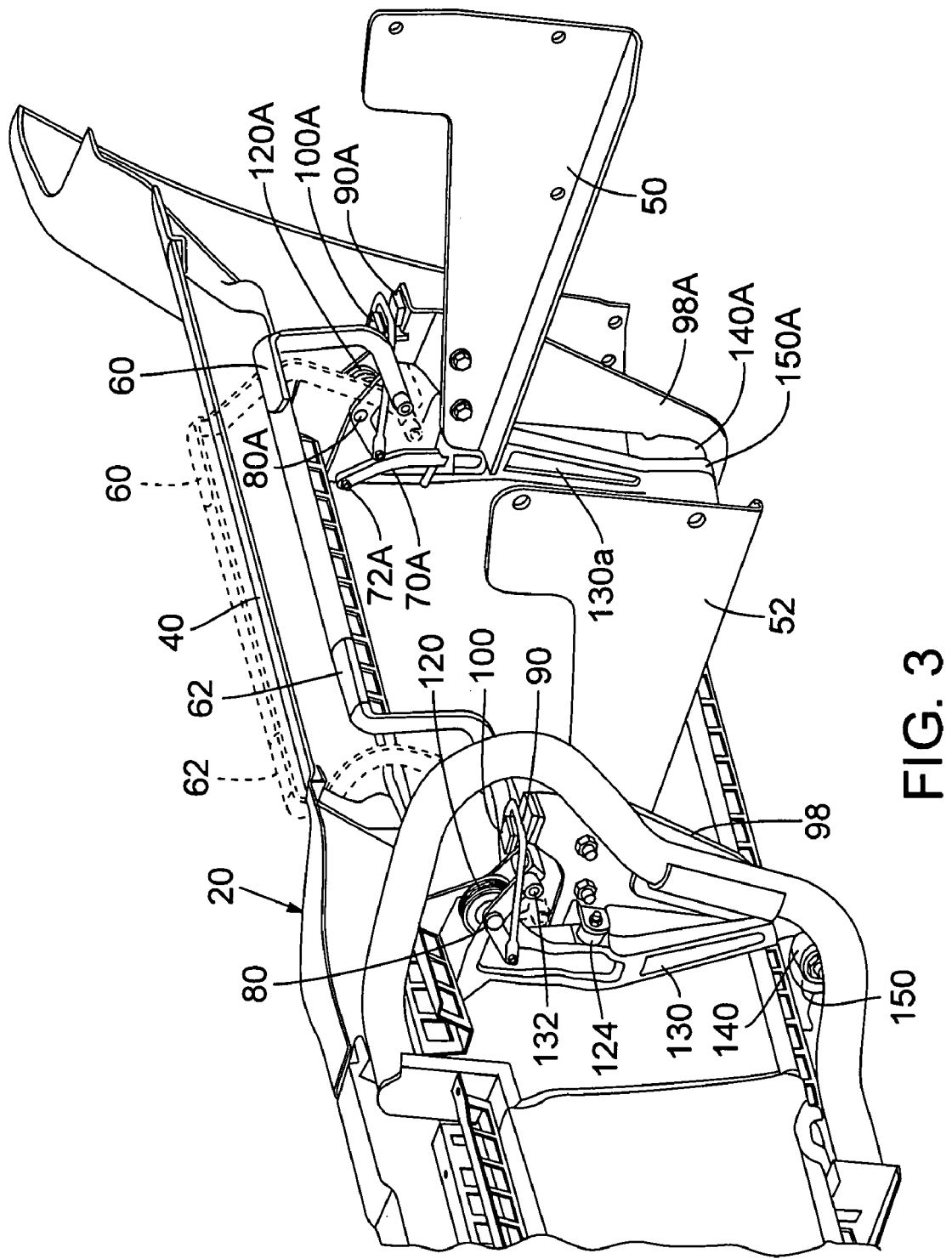
FIG. 3 is a perspective view, taken from behind the detachable panel and showing first and second exemplary latching mechanisms in a first position in solid lines and in a second position in dashed lines.

With reference to FIG. 2A-3, the loop 90 is shown dropped onto the catcher 100 but without latching force being applied to the loop. When the handle is in the position shown in FIG. 2A-3, handle 62 prevents the kick plate 40 from being pivoted to a closed position.

With reference to FIG. 2A-4, further rotation of handle 62 in the direction of arrow 110 results in an over center holding force being applied to the loop to latch the loop onto the catcher. In addition, the handle 62 is now clear of the kick plate 40 so that the kick plate 40 can be shifted to its closed position.

In the description that follows, the components of the latching mechanism associated with handle 60 are given the same number as the corresponding components associated with handle 62, but with the addition of the letter "A". In addition, although components of the embodiments shown in the remaining figures have different configurations than those shown in the schematic illustration of FIG. 2A, components associated with the handle 62 in these remaining figures have been given the same number as the corresponding components in FIG. 2A.

In the embodiment of FIG. 3, a biasing spring 120 is provided to bias the handle to its latched position. Also, an elastomeric stop 124 carried by the bracket 98 bears against a portion of a panel carried support 130. The stop 124 is compressed and provides a force urging the panel toward an open position when the handle is shifted to its over-center latching state. The support 130 carries the handle 62, loop 90, biasing spring 120 and a loop actuating portion 132 of the handle that lifts the loop off of the catcher 100 when the handle is moved from its latched to unlatched positions. A bushing 140 of a circular cross-section in this example is carried by a lower end portion of the panel bracket 130. A bushing receiving receptacle along a lower end portion of bracket 98 has a channel or opening that is shaped and configured to receive the bushing 140. End portion 150 may be generally hook shaped with an upwardly facing opening for receiving the bushing as the bushing is inserted into the bushing support. This connection allows the panel to pivot relative to the support 98 on the bushing 140 and relative to support 98A on a corresponding bushing 140A positioned within a bushing receptacle 150A.

Figure 3A:
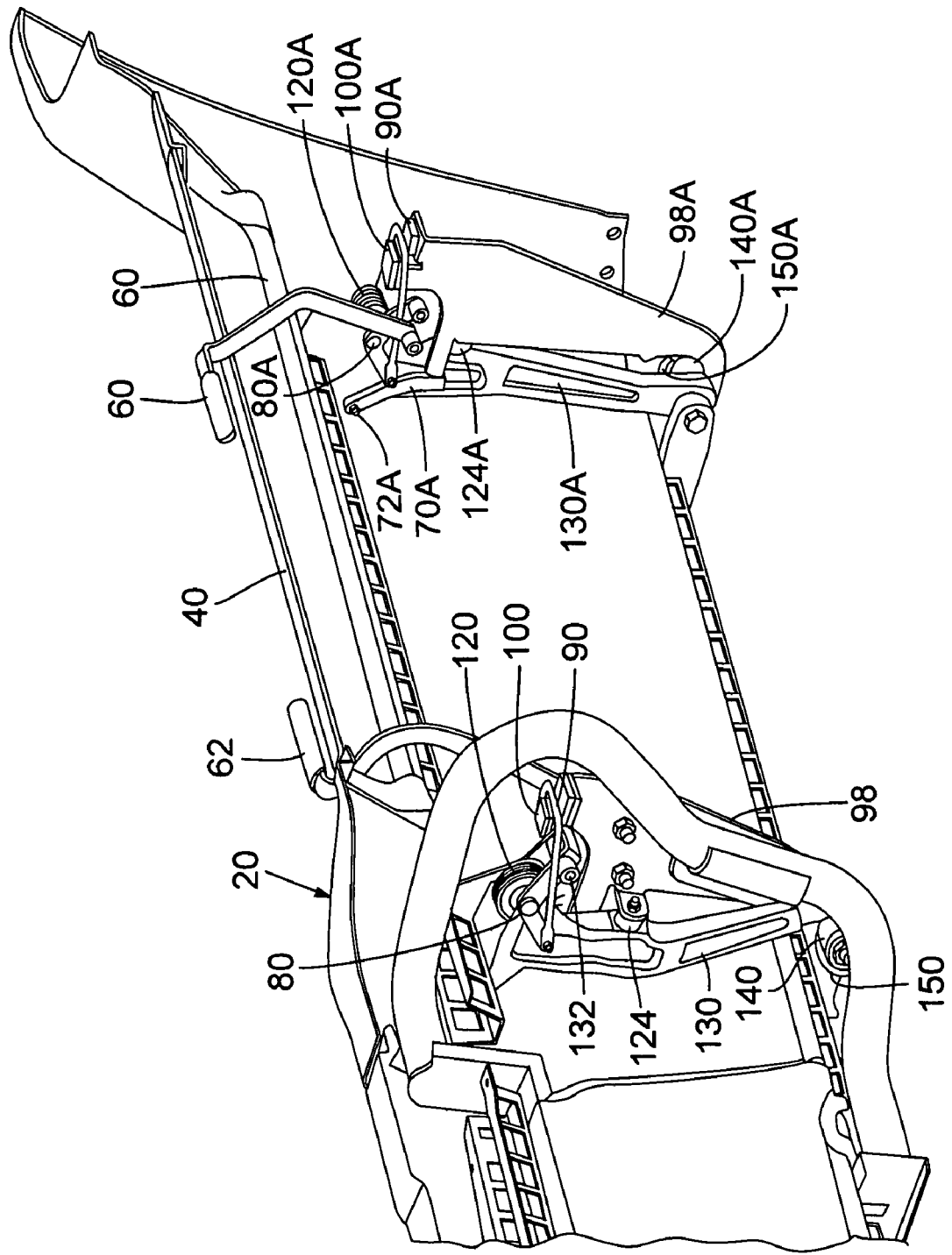
FIG. 3A is similar to FIG. 3 but with the latching mechanism shown in a second position.

FIG. 3A shows the handles 60,62 shifted to a position just prior to the lifting of latch members, in the example loops 90,90A from the associated loop catchers 100,100A. The components in FIG. 3A have been assigned the same numbers as the components in FIG. 3. For clarity, the frame mounting brackets 50 and 52 are not shown in FIG. 3A. In addition, the kicker plate 40 has been omitted in this figure as well.

Figure 3B:
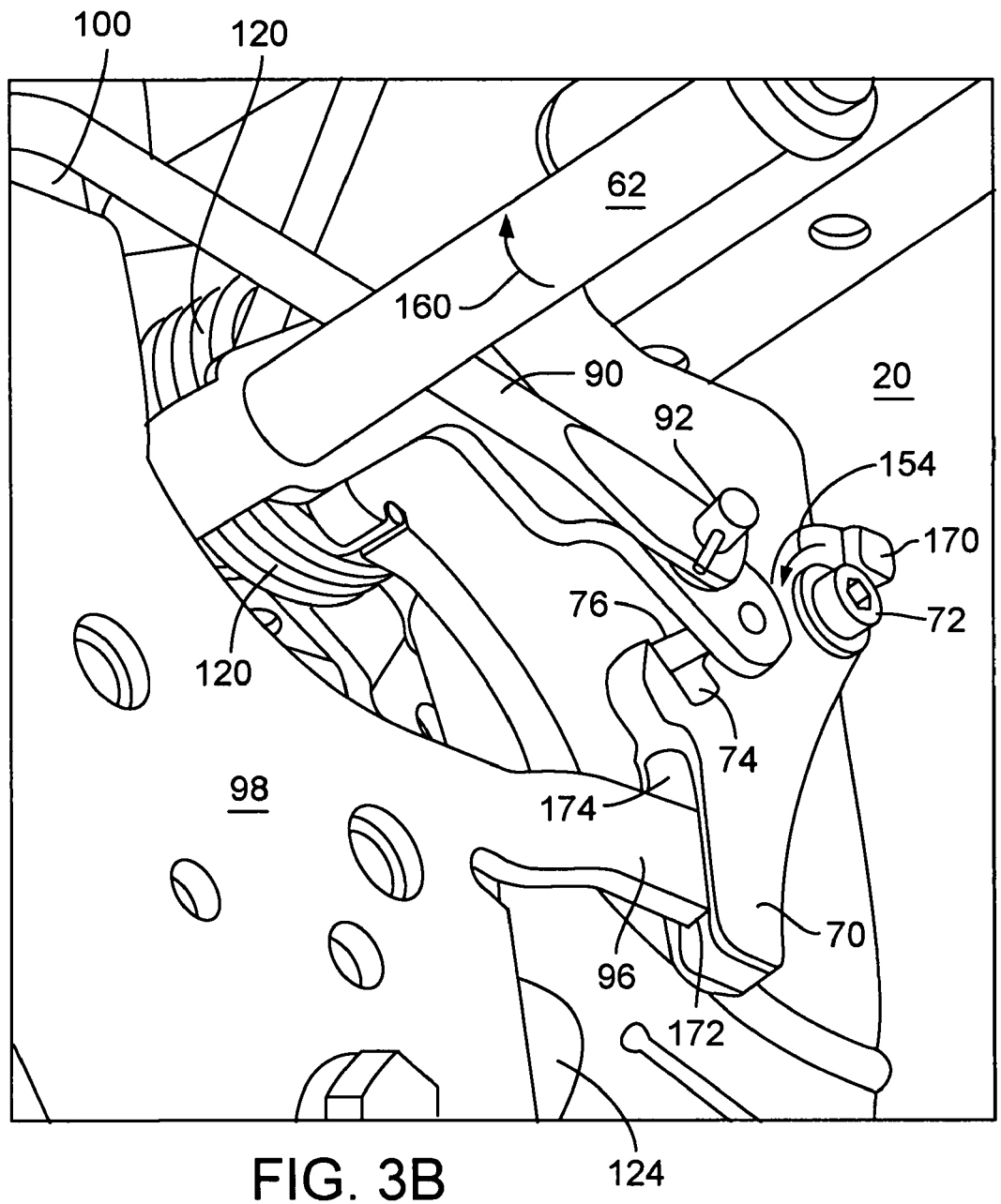
FIG. 3B is an enlarged view of a portion of one of the exemplary latching mechanisms.

FIG. 3B is an enlarged view of a portion of the exemplary latching mechanism with components numbered as previously discussed and shown in FIG. 2A and FIG. 3. In FIG. 3B, the keeper pin 74 is shown dislodged from the keeper pin receiving slot 76 as the handle is being rotated in the direction of arrow 160 toward an unlatched position. Continued rotation of the handle in this direction eventually allows keeper pin 74 to be received in slot 76 to latch the handles in the open position where the handles (handle 62 being shown in this figure) can be used to carry the panel. Assume the panel is being shifted or carried back to the vehicle. Following reception of the bushings 140,140A in the receiving openings 150,150A (FIG. 3) and pivoting of the panel toward a closed position, a first keeper pin dislodger 96 engages a surface 174 of the keeper. Member 96 urges the keeper away from the keeper pin in the direction of arrow 154 so that the keeper pin is withdrawn from the keeper pin slot and movement of the handles 60,62 to a latching position is permitted. A keeper stop 170 limits the motion of the keeper in the direction opposite to arrow 154. The keeper pin dislodger 96 can have an end portion 172 shaped for reception in a recess 174 formed in a dislodge engaging surface of the keeper to assist in positive engagement of the keeper by the keeper pin dislodger when the panel is being pivoted or shifted to a closed position. It should be noted that the latching mechanism which allows the handles to be used as latch carriers, is a desirably, but optional, feature of the technology.

Figure 4:
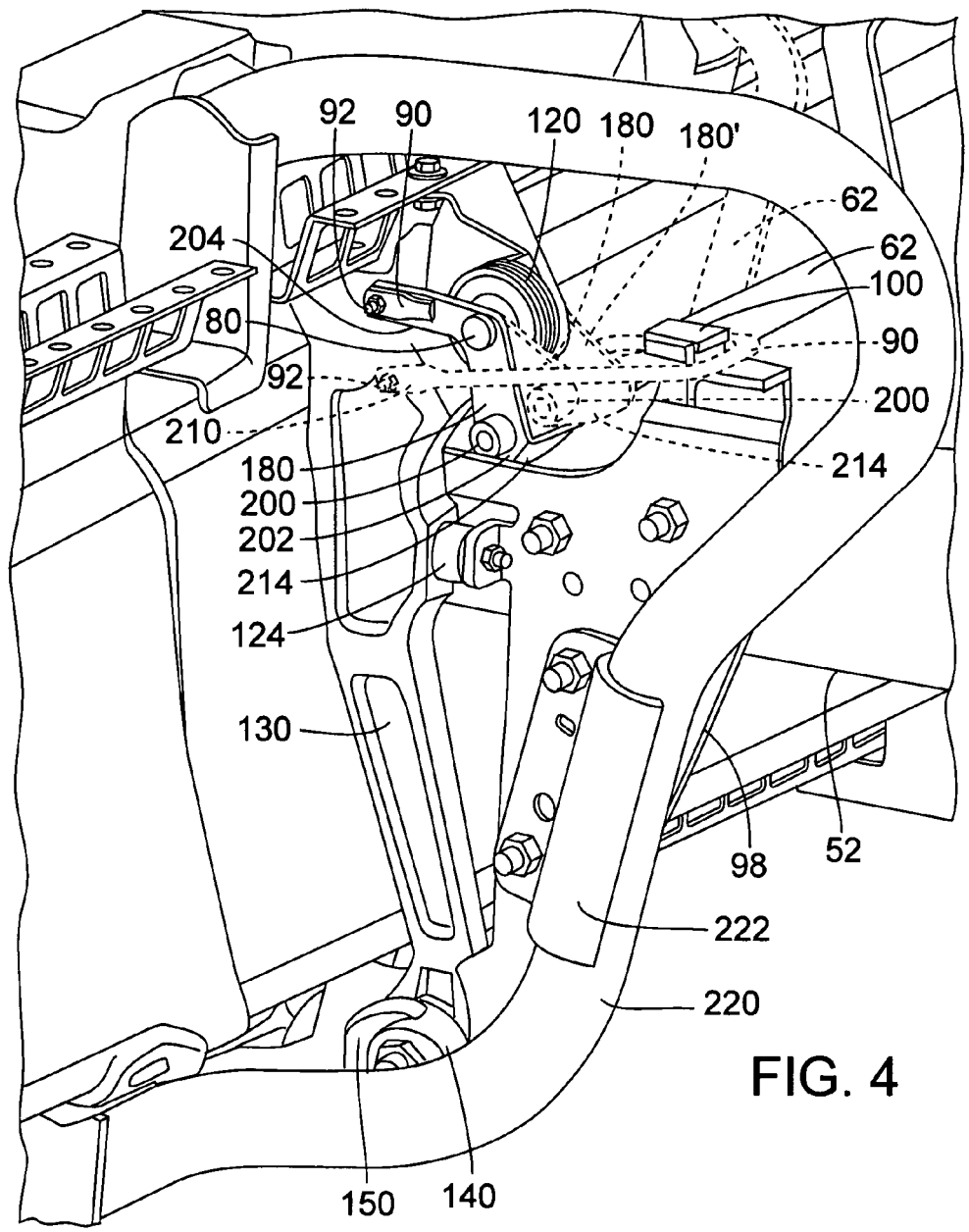
FIG. 4 is an enlarged view of a portion of the FIG. 3 embodiment.

FIG. 4 illustrates the latching loop 90 in a first position (partially shown in solid lines corresponding to a latched position) and in a second position (shown in dashed lines) wherein the loop 90 is ready to be lifted from the catcher 100 in response to continued movement of the handle 62 toward an unlatched position. The handle 62 is coupled to an arm member 180 pivotal about pivot 80. The illustrated arm member 180 is of an angled configuration and carries a latching loop engager 200 at a first end portion 202 of the arm. The opposite end portion 204 of the arm member carries the pivot 92 about which one end portion 210 of the loop is pivoted to the arm member 180. A spring 120 biases the arm member to the position shown in solid lines in FIG. 4. The assembly also comprises an arm member 180' and a cross portion 214 interconnecting the arm members 180, 180'. Thus, in the illustrated construction, the latch actuator comprises a bifurcated actuator mechanism comprising first and second arm portions 180,180' interconnected by cross portion 214 in a generally U-shape construction. As the arm member 180 is pivoted toward the unlatched position, loop engager 200 shifts upwardly in FIG. 4 and into a position engaging the underside of the loop 90. Continued movement of the arm 62 toward the open position results in the loop being lifted clear of the loop catcher 100. As can also be seen in FIG. 4, an additional reinforcement, for example tubular reinforcement 220, coupled to the vehicle, can be provided adjacent to the support 98. A bracket 222 can be coupled to reinforcement 220 and to the bracket 98 to provide additional support for the vehicle mounted portions of the panel carrying structure. A similar reinforcement 220A (not shown in FIG. 4) can also be provided for the support 98A. Alternatively, the panel carrying structure can be otherwise mounted to the vehicle, such as to the vehicle fuel tank.

Figure 4A:
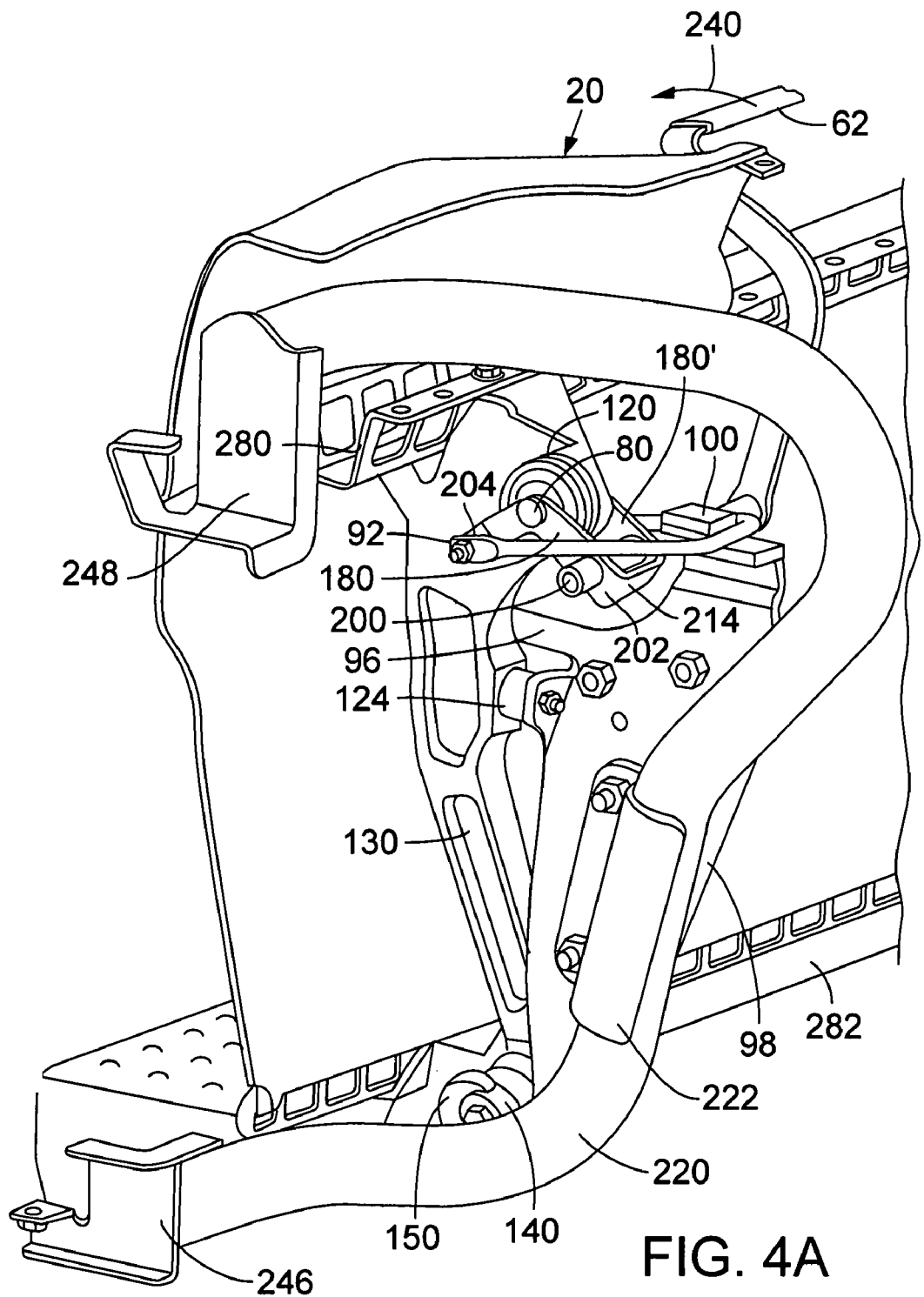
FIG. 4A is an enlarged view of a portion of the embodiment of FIG. 3.

FIG. 4A is similar to FIG. 4 except that only one position of the latching mechanism is shown. The position illustrated in FIG. 4 is such that further movement of the handle 62 in the direction of arrow 240 will cause loop engager 200 to lift the loop 90 free of the loop catcher 100. In FIG. 4A, mounting brackets 246,248 coupled to the respective lower and upper end portions of the tubular reinforcement 220 are shown in this figure and are adapted for coupling to the frame of the vehicle.

Figure 5:
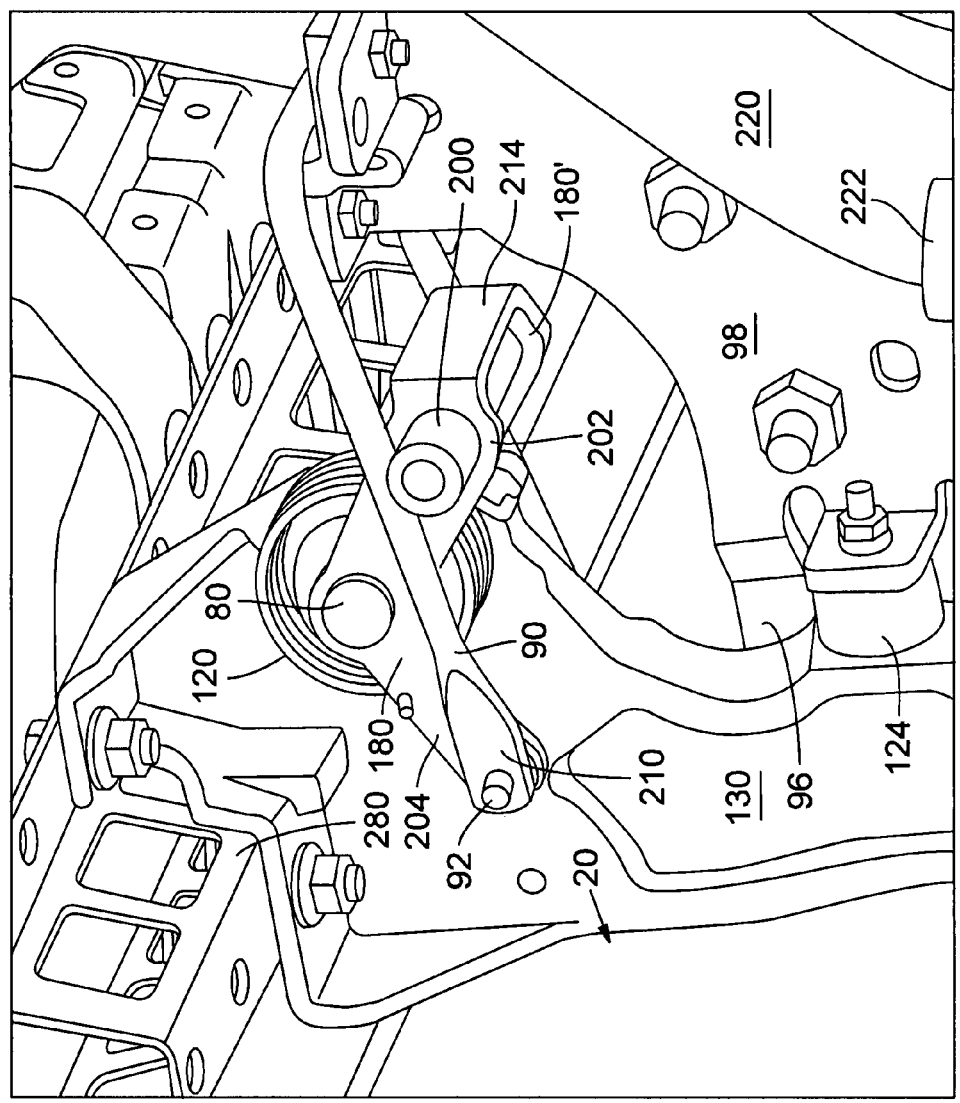
FIG. 5 is yet another view of a portion of an exemplary latching mechanism.

FIG. 5 is an enlarged view of a portion of the structure shown in FIG. 4A with components numbered as illustrated in FIG. 4A. In FIG. 5, an upper longitudinally extending panel reinforcement 280 is shown as well as couplings thereto. A lower reinforcement can be provided along the lower portion of the panel, such as indicated at 282 in FIG. 4A.

Figure 6:
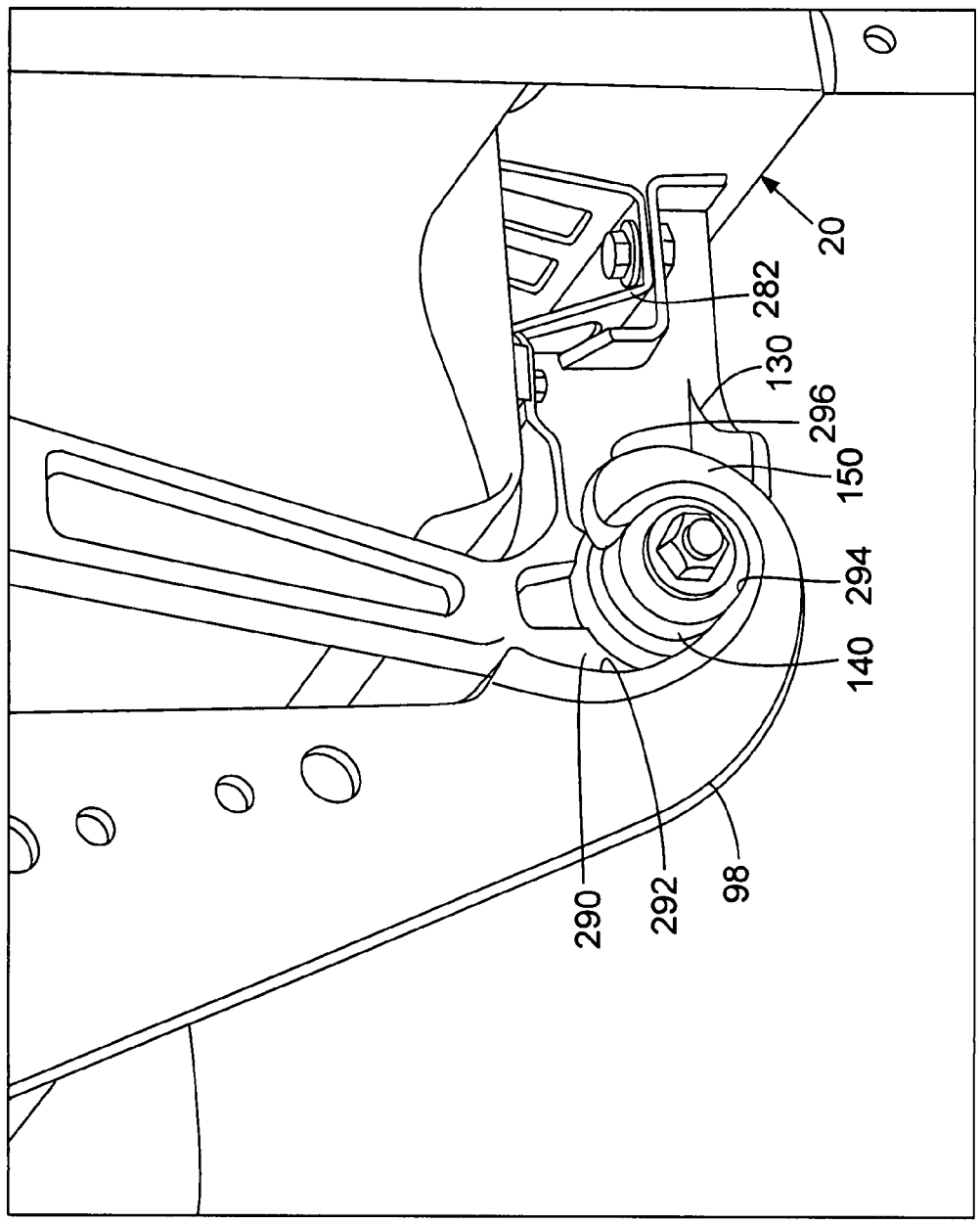
FIG. 6 is a perspective view of an exemplary panel support and panel coupling bushing.

FIG. 6 illustrates an exemplary lower panel receiving mechanism which, in the illustrated embodiment, permits pivoting of the panel (the upper portion of the panel) away from the vehicle when the latching mechanism is unlatched. As can be seen in FIG. 6, in the exemplary embodiment the panel receiving portion of support 98 comprises an upwardly opening panel pivot receiving slot 290 having a first arcuate guiding surface 292 adapted to receive and engage the panel bushing 140 of the illustrated embodiment to assist in moving the panel bushing toward the base 294 of the slot 290. The distal end of the portion of support 98 defining the receiving channel 290 desirably in this example extends toward the surface 292 to form a hook portion that assists in capturing the bushing 140 within opening 290 while still permitting pivoting of the panel when the latch mechanism is unlatched.

Figure 7:
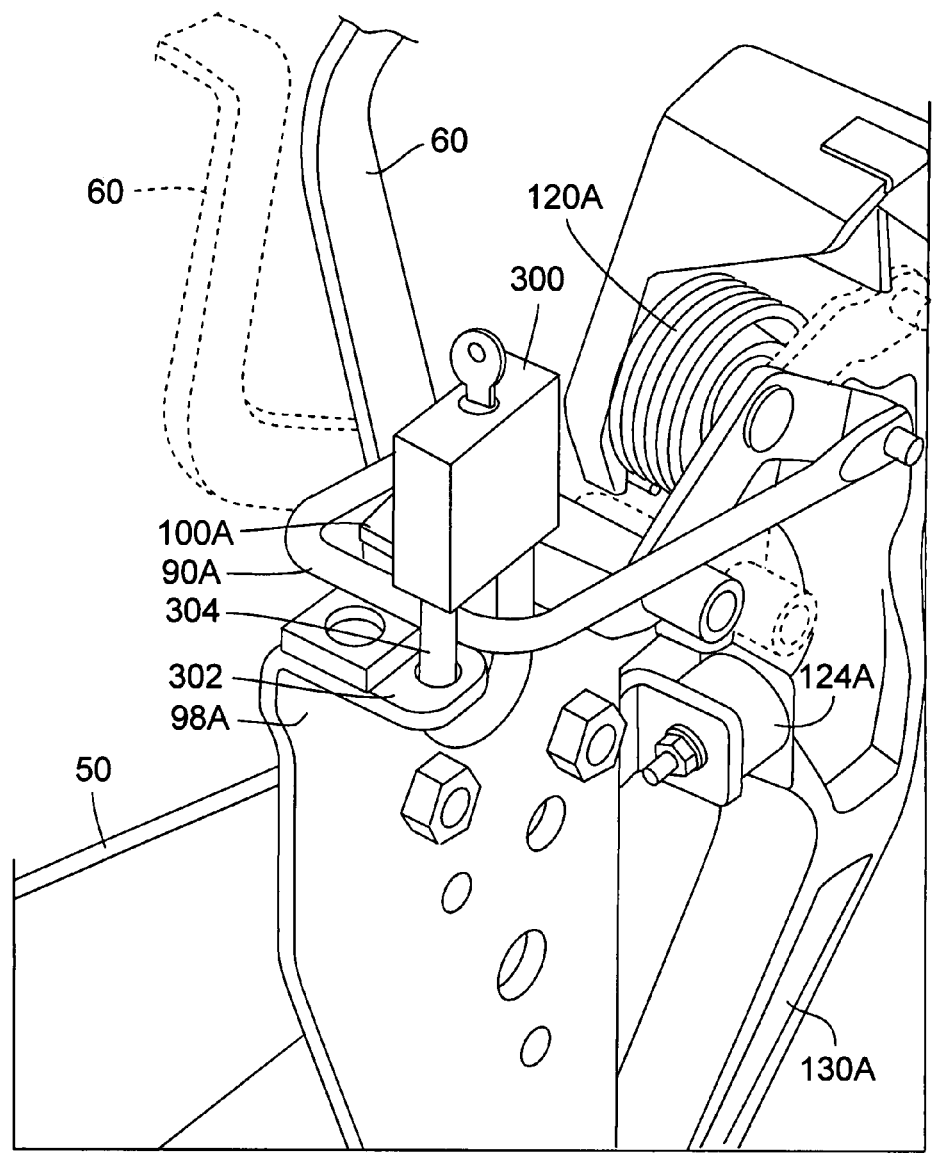
FIG. 7 illustrates a portion of a latching mechanism with a padlock shown in place to prevent unauthorized removal of the panel.

FIG. 7 illustrates an exemplary lock, in this case a padlock 300, that is shown locked to a flange 302 of support 98 with the flange 302 carrying the catcher 100. More specifically, the loop 90 is shown extending through a U-shaped portion 304 of lock 300 with the U-shaped portion 304 also extending through an opening through flange 302. As a result, even if the mechanism is unlatched, the lock 300 prevents the loop 90 from being lifted clear of the loop catcher 100 to thereby minimize the risk of unauthorized removal of the detachable panel.

Having illustrated and described the principles of our invention with reference to a number of embodiments, it should be apparent that this invention may be modified in arrangement and detail without departing from the inventive principles set forth herein. All such modifications are within the scope of this disclosure and the invention.

We claim:
1. A vehicle with a detachable side fairing comprising:
 a panel body comprising a front and a rear;
 an access opening being provided in the panel body to provide access through the access opening to the rear of the panel body from the front of the panel body;
 a door coupled to the panel body and movable from a first closed door position in which the door impedes access through the access opening and to at least one second door open position to allow access through the access opening;

a latch operable when in a latched position to latch the panel body to the vehicle when the panel body is in a panel latching position relative to the vehicle, the latch also being operable when in an unlatched position to unlatch the panel body from the vehicle to permit movement of the panel body away from the panel latching position and to a position wherein the panel body can be detached from the vehicle; and a latch actuator coupled to the panel body, the latch actuator being movable from a first actuator position to a second actuator position, the latch actuator being positioned at the rear of the door when the door is in the first closed door position and the latch actuator is in the first position, the latch actuator being positioned so as to be accessible from the front of the panel body through the access opening when the door is in an open position, the latch actuator being movable from the first actuator position to the second actuator position to shift the latch from the latched position to the unlatched position to unlatch the panel body when the panel body is in the panel latching position and latched to the vehicle, the latch actuator also being movable to the first actuator position to shift the latch from the unlatched position to the latched position to latch the panel body to the vehicle when the panel body is in the panel latching position.

2. A vehicle according to claim 1 wherein the latch actuator is configured to interfere with the movement of the door to the first closed door position when the panel body is in the panel latching position and the latch actuator is not in the first actuator position.

3. A vehicle according to claim 2 wherein the panel body comprises a plurality of steps, and wherein the door comprises a riser portion of one of the steps that is pivoted to the panel body for movement between the first door closed and second door open positions.

4. A vehicle according to claim 3 wherein the steps each comprise a tread surface, a first step being positioned above a second step, wherein the riser portion comprises a portion of the first step and is coupled to the panel body to pivot to a fully open position adjacent to the tread portion of the second step.

5. A vehicle according to claim 2 wherein there are first and second spaced apart latches and first and second latch actuators, each latch actuator being associated with a respective one of the latches, the first latch actuator comprising a first elongated handle and the second latch actuator comprising a second elongated handle, each of the handles being movable between the first actuator and the second actuator positions.

6. A vehicle according to claim 5 wherein the handles are configured to extend at least partially through the access opening from the rear to the front of the panel when the latch actuator is not in the first actuator position to prevent movement of the door to the first closed door position when the latch actuator is not in the first actuator position.

7. A vehicle according to claim 6 comprising a handle keeper operable to selectively lock the handles against further motion when the handles are moved from the first actuator position to the second actuator position to thereby facilitate use of the handles for carrying the panel body.

8. A vehicle according to claim 5 wherein each latch comprises at least one latch catcher coupled to the vehicle and at least one catcher engager coupled to the latch actuator and movable to a catcher latched position in engagement with the latch catcher when the associated handle is moved from the second actuator position to the first actuator position and the panel body is in the panel latching position, the at least one catcher engager also being movable to a catcher unlatched position disengaged from the latch catcher when the handle of the associated latch actuator is moved from the first actuator position to the second actuator position and the panel body is in the panel latching position.

9. A vehicle according to claim 8 wherein each catcher engager comprises a loop pivoted to the associated latch actuator, the latch actuator comprising a loop lifter operable to engage the loop and lift the loop free of the loop catcher in response to shifting the associated latch actuator from the first actuator position to the second actuator position with the panel body in the panel latching position to permit movement of the panel body away from the panel latching position.

10. A vehicle according to claim 9 wherein the latch actuator and latch comprise an over-center latching mechanism.

11. A vehicle according to claim 5 wherein at least one of the handles are configured to extend at least partially through the access opening from the rear to the front of the panel body when the latch actuator associated with said at least one of the handles is not in the first actuator position.

12. A vehicle according to claim 5 wherein the handles are each configured to extend at least partially through the access opening from the rear to the front of the panel body when the associated latch actuators are not in the first actuator position.

13. A vehicle according to claim 5 comprising a handle keeper operable to selectively lock the handles against further motion when the handles are moved from the first actuator position to the second actuator position to thereby facilitate use of the handles for carrying the panel.

14. A vehicle according to claim 13 wherein there are plural handle keepers, each handle keeper being associated with a respective associated one of the handles, each handle keeper comprises a keeper body pivotally coupled to the panel body, the keeper body comprising a pin receiving slot, the associated handle comprising a pin positioned to slide into the pin receiving slot of the associated keeper body as the associated handle is moved from the first actuator position to the second actuator position, a keeper engager coupled to the vehicle and positioned to engage the keeper body to pivot the keeper body such that the pin exits the slot and releases the associated handle to move from the second actuator position to the first actuator position as the panel body is moved toward the panel latching position.

15. A vehicle according to claim 14 wherein the vehicle comprises first and second spaced apart pivot member supports, each with an upwardly opening pivot slot bounded along one side by a hook shaped portion, the panel body comprising first and second pivots that are positioned in the respective pivot slots of the first and second pivot member supports, such that the panel body is pivotable toward the panel latching position when the first and second pivots are positioned in the pivot slots, the pivots being liftable from the slots to detach the panel body from the vehicle upon pivoting of the panel body away from the panel latching position, and whereby positioning of the first and second pivots in the respective pivot slots guides the movement of the panel body and allows pivoting of the panel body as the panel body is moved toward the panel body latching position.

* * * * *